United States Patent [19]
Krosner et al.

[11] Patent Number: 5,905,494
[45] Date of Patent: May 18, 1999

[54] METHOD AND SYSTEM WITHIN AN OBJECT ORIENTED PROGRAMMING ENVIRONMENT FOR ENHANCED EFFICIENCY OF ENTRY OF OPERATOR INPUTS UTILIZING A COMPLEX OBJECT

[75] Inventors: Stephen P. Krosner, Marietta; Floyd W. Shackelford, Buford, both of Ga.

[73] Assignee: International Business Machines Corporation, Armonk, N.Y.

[21] Appl. No.: 07/929,082

[22] Filed: Aug. 12, 1992

[51] Int. Cl.$^6$ ...................................................... G06F 17/40
[52] U.S. Cl. ................................................................ 345/335
[58] Field of Search ..................................... 395/155, 156, 395/157, 158, 160, 135, 149, 153; 345/119, 120, 335

[56] References Cited

U.S. PATENT DOCUMENTS

| | | | |
|---|---|---|---|
| 4,791,561 | 12/1988 | Huber ........................................... | 707/1 |
| 4,805,099 | 2/1989 | Huber ....................................... | 707/102 |
| 4,896,291 | 1/1990 | Gest et al. ............................... | 345/353 |
| 4,918,593 | 4/1990 | Huber ..................................... | 707/200 |
| 4,982,344 | 1/1991 | Jordan ..................................... | 345/346 |
| 5,040,132 | 8/1991 | Schuricht et al. ...................... | 707/507 |
| 5,041,967 | 8/1991 | Ephrath et al. ......................... | 345/352 |
| 5,045,994 | 9/1991 | Belfer et al. ............................ | 395/500 |
| 5,047,960 | 9/1991 | Sloan ....................................... | 707/507 |
| 5,228,123 | 7/1993 | Heckel .................................... | 345/334 |
| 5,241,624 | 8/1993 | Torres ..................................... | 345/429 |
| 5,287,447 | 2/1994 | Miller et al. ............................ | 345/342 |
| 5,325,478 | 6/1994 | Shelton et al. .......................... | 707/507 |

OTHER PUBLICATIONS

Unruh, ZIP/Clip, Data Based Advisor, Dec. 1990, p. 108.
Simon, Zipkey Moves zip code data into underlying applications, PC Magazine, Jan. 16 1990, p. 48.
Van Kirk, Postal Progress, PC Computing, Nov. 1989, p. 50.
Microsoft, Windows 3.0 User Manual, 1990, p. xxii.
Gunther, Adding On–Screen Look–Ups, Data Based Advisor, Apr. 1989, pp. 27–32.
Straley, Family Ties, Data Based Advisor, May 1991, pp. 128–130.
Southerton, Programmer's Guide To Presentation Manager, 1989, pp. 205–213.

*Primary Examiner*—Anton Fetting
*Attorney, Agent, or Firm*—Kenneth A. Seaman; Andrew J. Dillon

[57] ABSTRACT

A method and system in an object oriented programming environment within a data processing system are provided for enhancement of the efficiency of entry of operator inputs utilizing a complex object. The complex object is associated with a plurality of objects within the object oriented programming environment. Each of the plurality of objects is associated with a different one of a plurality of operator input fields. Each of the plurality of operator input fields is associated with a plurality of selectable operator inputs. In response to a selection of an attribute by an operator, permitted combinations of the selectable operator inputs are automatically determined utilizing the complex object. The permitted combinations of the selectable operator inputs which have been automatically determined are then presented to an operator for selection. Each of the selectable operator inputs included within the permitted combination selected by an operator is then automatically entered into a different one of the operator input fields for each of the plurality of objects.

8 Claims, 4 Drawing Sheets

METHOD AND SYSTEM WITHIN AN OBJECT ORIENTED PROGRAMMING ENVIRONMENT FOR ENHANCED EFFICIENCY OF ENTRY OF OPERATOR INPUTS UTILIZING A COMPLEX OBJECT

BACKGROUND OF THE INVENTION

1. Technical Field

The present invention relates in general to data processing systems and in particular to the automatic entering of associated operator inputs into multiple related operator input fields in a data processing system. Still more particularly, the present invention relates to the automatic entering of associated operator inputs into multiple related operator input fields in response to a selection of a set of permitted combinations of associated operator inputs which are automatically determined within a data processing system.

2. Description of the Related Art

Graphical user interfaces are well known in the art. Users may select a particular activity for the data processing system to perform utilizing graphical input devices such as a keyboard, pointing stick, mouse, track ball, pen, or touch display screen. These particular activities, such as "print document" or "select a document" may be represented to the user in the form of input fields which are graphically displayed on the computer display screen and selected by the user by striking a particular key or series of keys on the keyboard, or by utilizing a graphical pointing device such as a mouse, by positioning the mouse pointer over an input field and clicking a mouse button.

Once an input field has been selected, a user may be prompted to enter appropriate information into the field in order to perform the function represented by the field. For example, a user may be prompted to enter a document name into the "print document" field in order to have the entered document printed by the data processing system. Modern data processing systems may also present to a user a suggested entry or list of entries for entry into the selected field. An example of such a system is an auto-install program that automatically installs an operating system or application program into a data processing system. Such auto-install programs present input fields to a user and suggest a possible entry. The user may select the suggested entry or may select an entry from a list of all possible entries. After a user has selected an entry for the input field presented, the auto-install program presents a second input field and suggests a possible entry for that input field. This process typically continues until each input field has been presented and filled utilizing either a suggested entry or an entry from a list of all possible entries for the presented field.

It should therefore be apparent that a need exits for a method and system for enhancing the efficiency of user inputs into multiple user input fields.

SUMMARY OF THE INVENTION

It is therefore one object of the present invention to provide an improved method and system for the automatic entry of associated operator inputs into multiple related operator input fields in a data processing system.

It is another object of the present invention to provide an improved method and system for the automatic determination of sets of permitted combinations of associated operator inputs for entry into multiple related operator input fields within a data processing system.

It is yet another object of the present invention to provide an improved method and system for the automatic entry of associated operator inputs into multiple related operator input fields in a data processing system in response to a selection of a set of permitted combinations of associated operator inputs.

The foregoing objects are achieved as is now described. A method and system within a data processing system are provided for enhancement of the efficiency of associated operator inputs into multiple related operator input fields. In response to a selection of an attribute by an operator, permitted combinations of associated operator inputs for multiple related operator input fields are automatically determined. The permitted combinations of associated operator inputs which have been automatically determined are then presented to an operator for selection. An operator input is then automatically entered into each of multiple related operator input fields in response to an operator selection.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
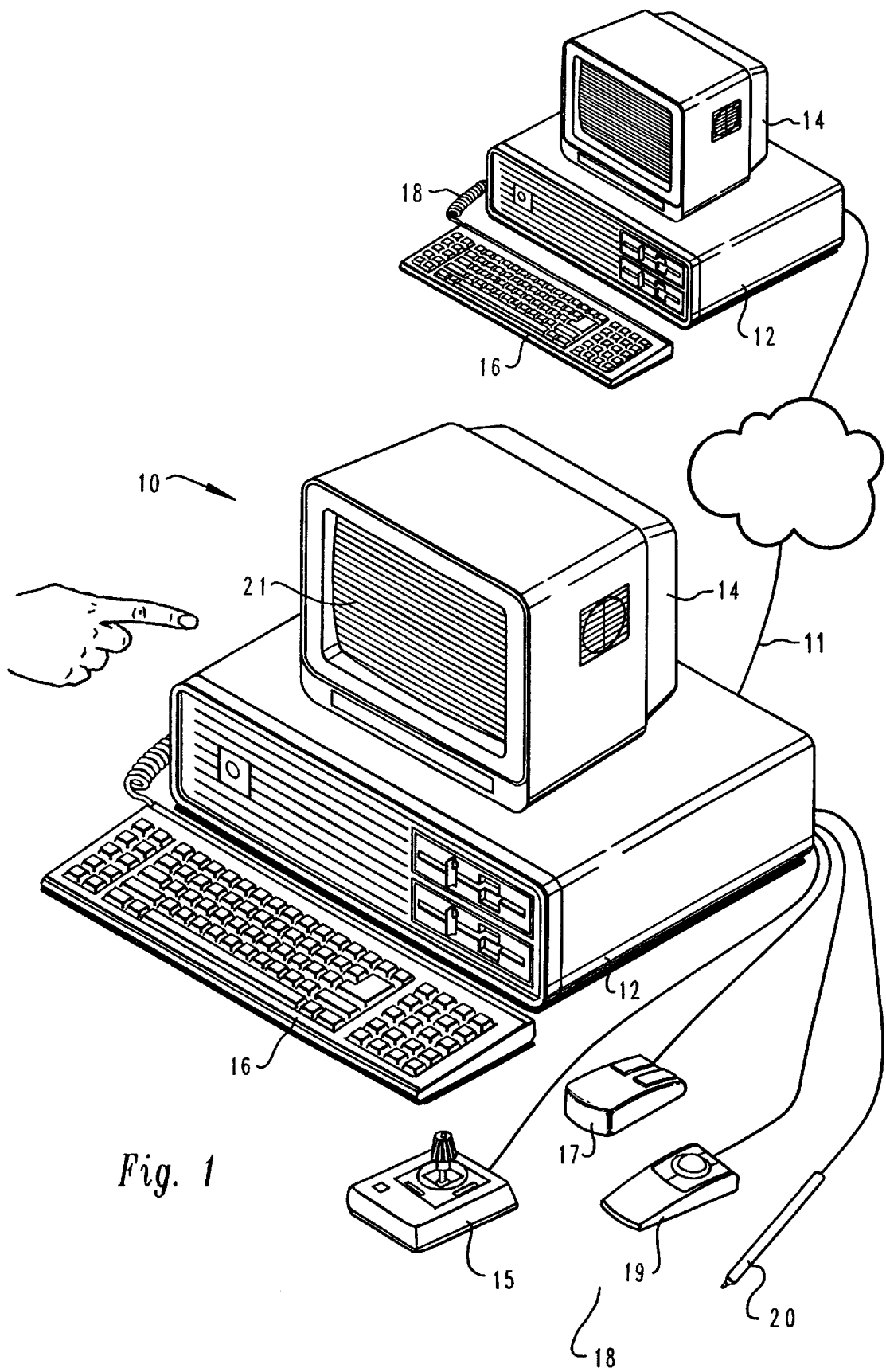
FIG. 1 depicts a pictorial representation of a personal computer system which may be utilized to implement the method and system of the present invention.

With reference now to the figures and in particular with reference to FIG. 1, there is depicted a pictorial representation of a personal computer system 10 which may be utilized to implement the method and system of the present invention. As those skilled in the art will appreciate, personal computer system 10 may be connected to other personal computer systems via a network 11. Personal computer system 10 preferably includes a system unit 12, computer display screen 14, keyboard 16, and multiple graphical input pointing devices 18. Those skilled in the art will appreciate that graphical input pointing devices 18 may be implemented utilizing a pointing stick 15, a mouse 17, a track ball 19, a light pen 20, touch display screen 21, or any other device that permits a user to manipulate objects in a graphical manner on display screen 14.

Figure 2:
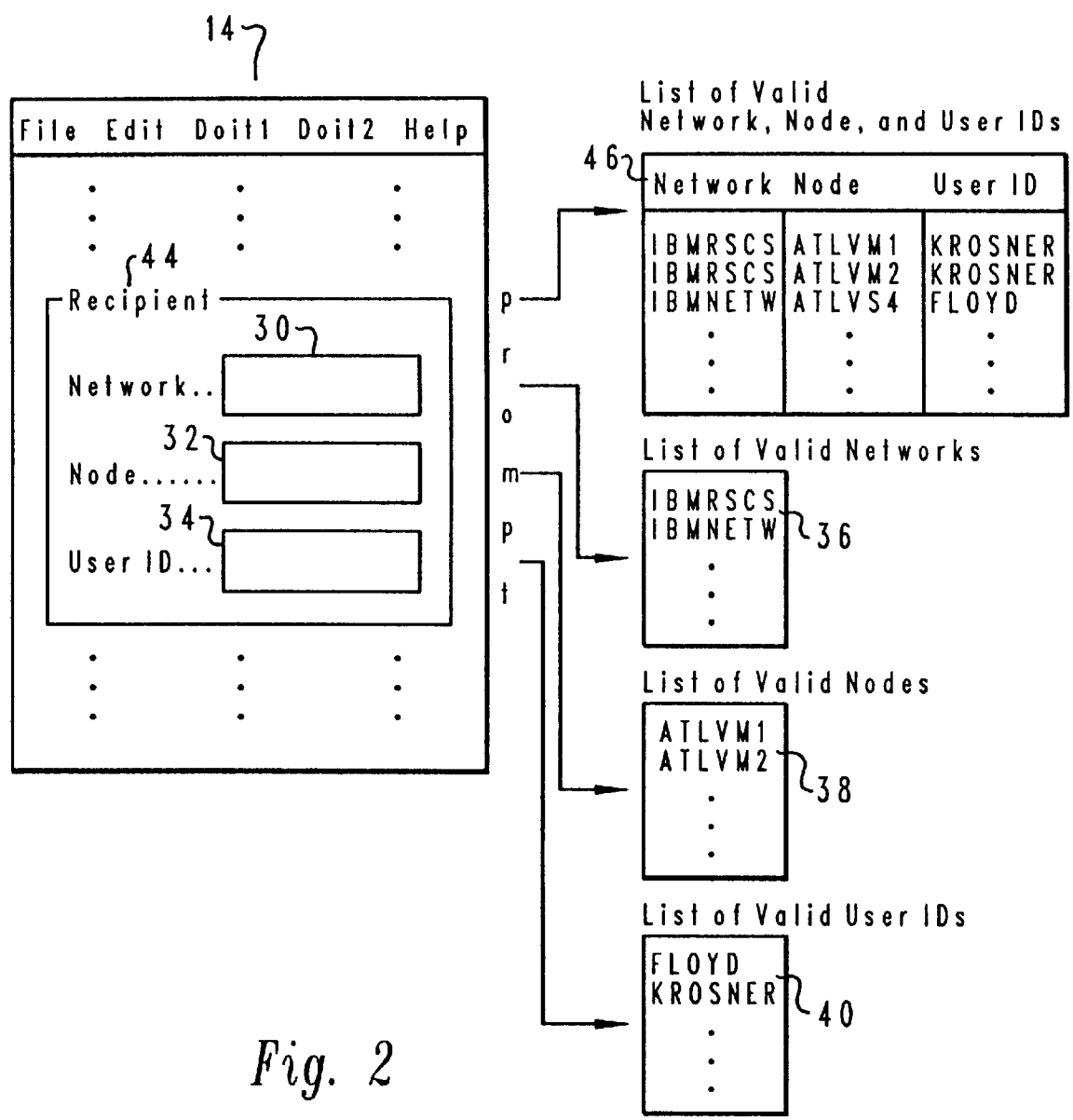
FIG. 2 illustrates a pictorial representation of a computer display screen depicting operator input fields and operator inputs determined in accordance with the present invention.

Referring now to FIG. 2, there is illustrated a pictorial representation of computer display screen 14 depicting operator input fields 30, 32, 34, and multiple lists of operator inputs 36, 38, and 40. In accordance with the present invention, an operator is permitted to select either an attribute 44, or an operator input field 30, 32, or 34. For each operator input field selected, the permitted operator inputs for that field will be presented. For example, if operator input field 30 is selected, a list of permitted operator inputs 36 for operator input field 30 will be presented. Similarly, if operator input field 32 is selected, a list of permitted operator inputs 38 for operator input field 32 will be presented. An operator may thereafter select an operator input from the list of operator inputs presented and enter the selected operator input into the operator input field.

As will be appreciated, some operator input fields may be related. Within a data processing system, networks of users are typically created in order to enhance the efficiency of the data processing system. Each user of the network may have an associated unique user identification (user ID), network name, and node address. In order to communicate with a selected user via a network, a permitted combination of associated operator inputs for user ID, network name, and node address are required. Operator input field 30 for network name, operator input field 32 for node address, and operator input field 34 for user ID are related.

In accordance with the method and system of the present invention, an operator may be assured of entering a valid combination of associated operator inputs into related operator input fields by selecting an attribute 44 by graphically selecting a related field, as illustrated. In response to an operator selection of attribute 44, a list of permitted combinations 46 of associated operator inputs are presented to an operator for entry into related operator input fields 30, 32, and 34. An operator may therefore select one of the list of permitted combinations 46 presented. An associated operator input included within the operator selected one of the list of permitted combinations 46 is then entered into each related operator input field. An operator may then select, or prompt, an attribute 44 in order to automatically enter operator inputs into all three operator input fields. In this manner, valid operator inputs may be entered into all three operator input fields in response to an operator selection of an attribute and one selection from a list of permitted combinations.

In the prior art, it is known that an operator may select, or prompt, each operator input field separately. In such systems, an operator is required to select an operator input field and thereafter select an operator input for each of multiple operator input fields. Therefore, in order to enter operator inputs into operator input fields 30, 32, and 34, an operator is required to make six selections. In addition, it is possible in such systems that an operator may have entered an invalid combination of operator inputs.

Figure 3:
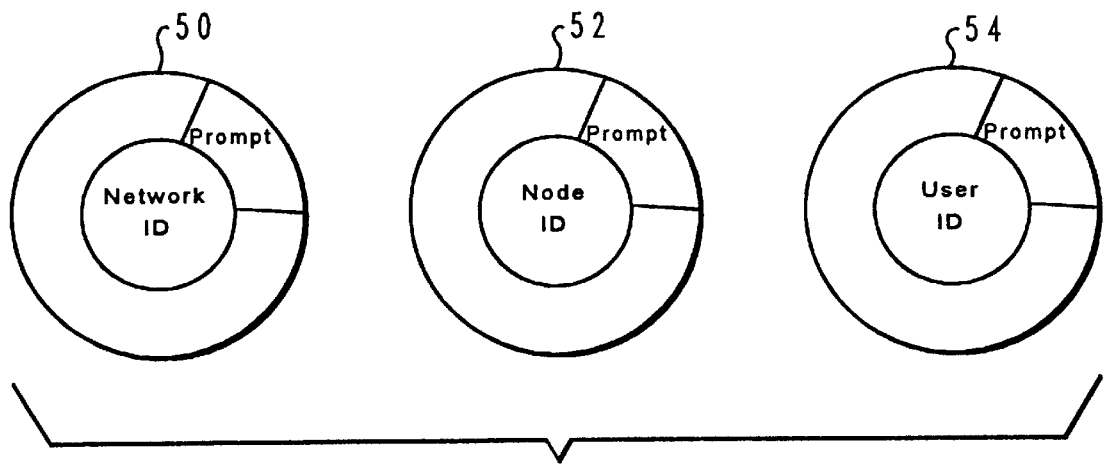
FIG. 3 illustrates multiple graphical representations of objects which represent operator input fields in accordance with the prior art.

With reference now to FIG. 3, there are illustrated multiple graphical representations of objects 50, 52, and 54 which represent operator input fields in accordance with the prior art. An object in an object oriented environment typically consists of related pieces of code and data. An object generally has a library of methods which are essentially unique to an object, giving an object its specific behaviors. The class of an object defines a grouping based on one or more properties, and an instance is a single item in a class. A class may define methods for constructing new instances and also instance methods which define how an instance behaves and reacts to incoming messages. Instance variables define the particular features of an instance of an object. These instance variables may be defined or may be empty, awaiting definition. An instance's data structure is generally described by its collection of instance variables.

Referring again to FIG. 3, when an operator selects, or prompts, an operator input field, such a network name field, the "prompt" method of network object 50 is invoked and the system then searches a database which includes information about the data processing system. The "prompt" method of network object 50 then presents a list of possible operator inputs for entry into the network name field. Once an operator has selected an operator input from the list, the selected operator input is then entered into the network name field. Those skilled in the art will recognize that the same method occurs, as described above and illustrated by FIG. 3, when an operator selects a node name field associated with node object 52, or selects a user ID field associated with user ID object 54.

Figure 4:
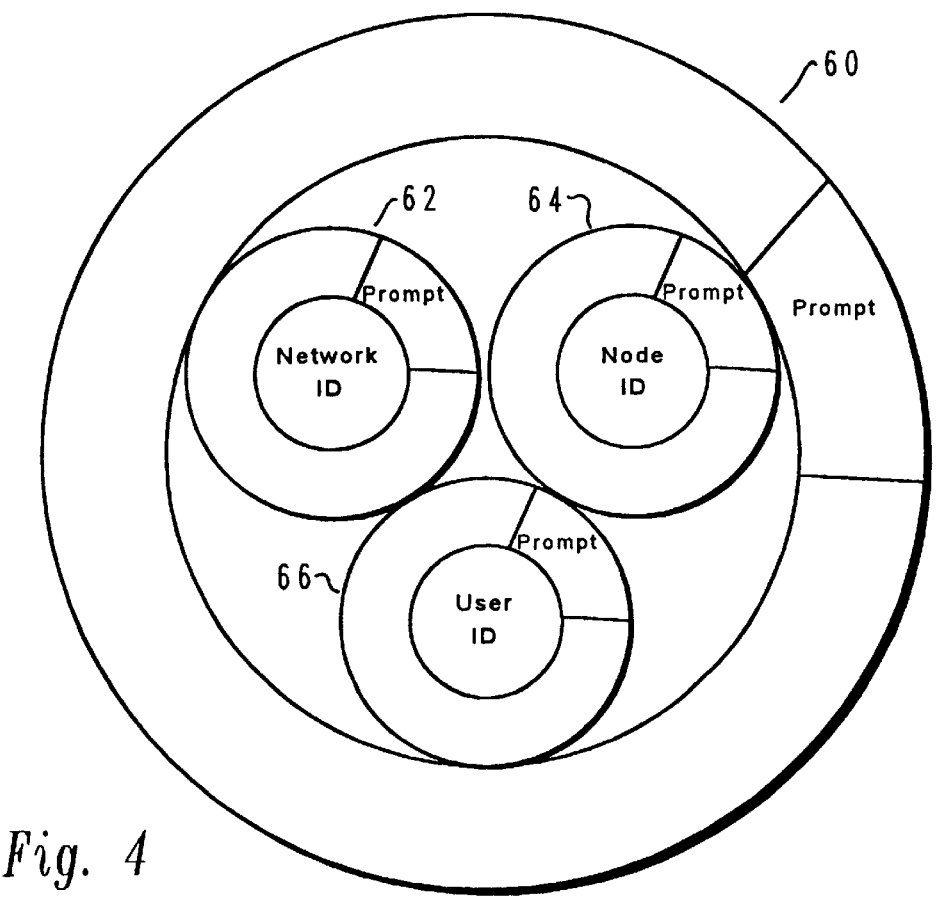
FIG. 4 illustrates a graphical representation of object which represents operator input fields in accordance with the method and system of the present invention.

Referring now to FIG. 4, there is illustrated a graphical representation of object 60 which represents associated operator input fields in accordance with the present invention. As illustrated, object 60 is a complex object. Complex objects have the same characteristics as other objects and, in addition, have the unique characteristic that a complex object is comprised of other objects which are related. In order to communicate with a selected user within the network, associated operator inputs for the network name, node address, and user ID for the selected user are all required. Object 60 is comprised of three related objects: a network object 62, a node object 64, and a user ID object 66. When "prompted" by object 60, network object 62 will return a list of network names, node object 64 will return a node addresses, and user ID object 66 will return a list of user IDs.

When an operator selects attribute 44, in the manner described above, indicating that the operator desires to enter operator inputs into multiple operator input fields 30, 32, and 34, the "prompt" method of object 60 is invoked. The "prompt" method of object 60 then invokes the "prompt" methods of network object 62, node object 64, and user ID object 66, typically by sending each object a message. Within an object oriented environment, a message is typically utilized to cause a method to be executed. Objects 62, 64, and 66 then responds by returning a list of valid data to object 60. As described above, network object 62 will then return a list of network address which may be utilized as operator inputs into operator input field 36. Node object 64 will return a list of node address which may be utilized as operator inputs into operator input field 32. Finally, user ID object 66 will return a list of user ID's which may be utilized as operator inputs into operator input field 34.

In accordance with the method and system of the present invention, object 60 receives each list from objects 62, 64, and 66 and then constructs a list of permitted combinations 46 of associated operator inputs (see FIG. 2). The operator may then select one of the list of permitted combinations 46 which have been presented. After a selection by an operator, an operator input is then automatically entered each operator input field 30, 32, and 34. An operator is therefore prevented from making an invalid combination of associated operator inputs.

Figure 5:
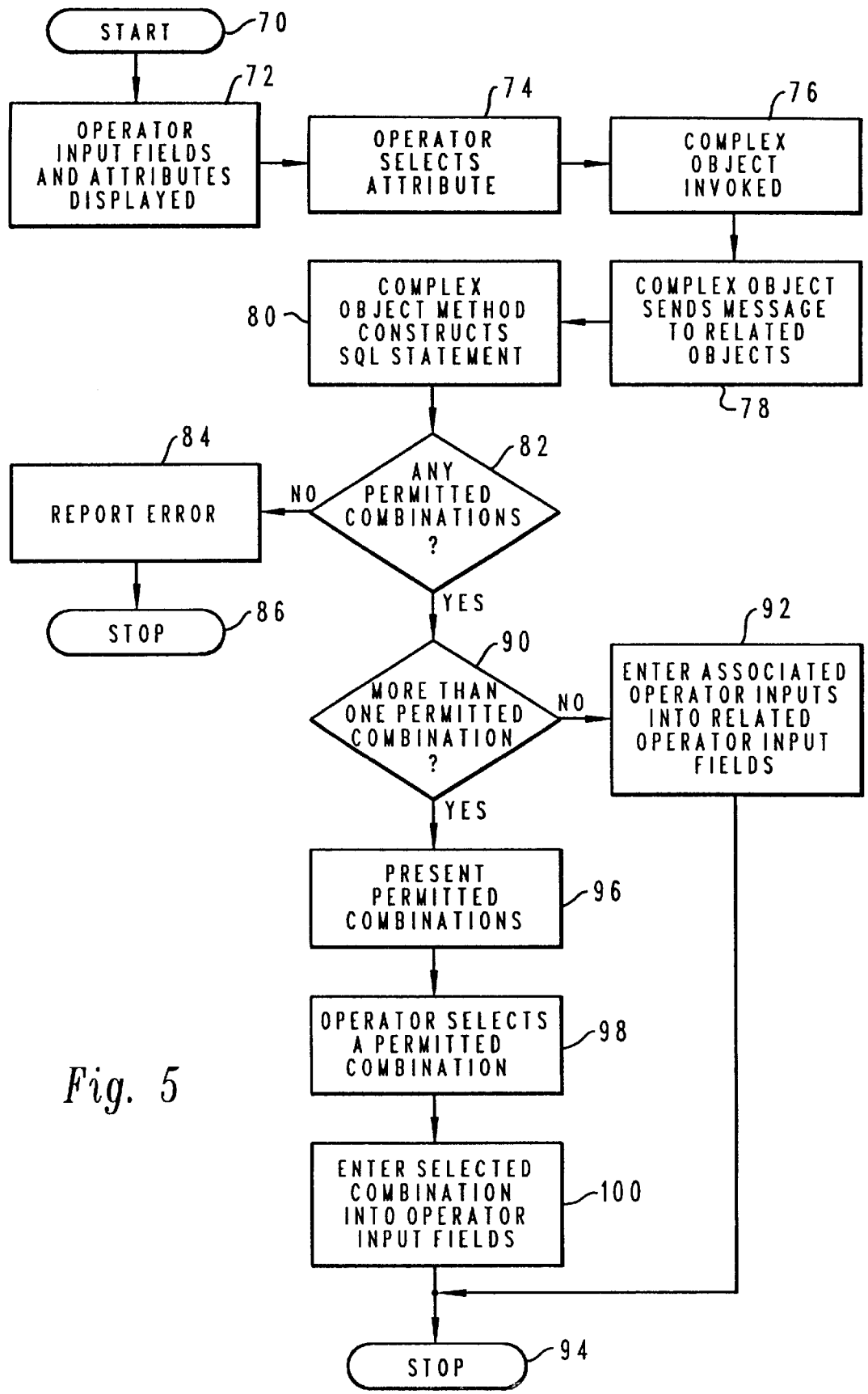
FIG. 5 depicts a high level flow chart illustrating the automatic entry of associated operator inputs into multiple related operator input fields in accordance with the method and system of the present invention.

Now referring to FIG. 5, there is depicted a high level flow chart illustrating the automatic entry of associated operator inputs into related operator input fields in accordance with the method and system of the present invention. The process starts at block 70 and thereafter passes to block 72 which illustrates the displaying of attributes and operator input fields. The process next passes to block 74 which depicts an operator selection of an attribute which permits multiple input entry. Thereafter, the process passes to block 76 which illustrates the invocation of a complex object in response to a selection of that attribute. Block 78, then depicts a complex object sending a "prompt" message to all related objects within the complex object.

The process then passes to block 80 which illustrates the construction of an Structured Query Language (SQL) statement by a complex object method which will be utilized to access a database and automatically determine permitted combinations of associated operator inputs. Structured Query Language is a data definition and manipulation language utilized in relational databases. Thereafter, the process passes to block 82 which depicts a determination of whether or not there exists a permitted combination. If a determination is made that no permitted combination exists, the process passes to block 84 which illustrates the reporting of an error. The process then terminates, as depicted at block 86.

Referring again to block 82, if a determination is made that there exist permitted combinations, the process passes to block 90, which depicts a determination of whether or not there exists more than one permitted combination. If a determination is made that there exists only one permitted combination, the process passes to block 92 which illustrates the entry of associated operator inputs into each related operator input field. The process then terminates, as depicted at block 94.

Referring again to block 90, if a determination is made that there exists more than one permitted combination, the process passes to block 96 which illustrates the presentation of a list of permitted combinations. The process next passes to block 98 which depicts the selection of a permitted combination by an operator. Thereafter, the process passes to block 100 which illustrates the entry of associated operator inputs into each of the multiple related operator input fields. The process then terminates again, as depicted at block 94.

While the invention has been particularly shown and described with reference to a preferred embodiment, it will be understood by those skilled in the art that various changes in form and detail may be made therein without departing from the spirit and scope of the invention.

We claim:

1. A method in an object oriented programming environment within a data processing system for enhancing the efficiency of entry of operator inputs into a plurality of operator input fields utilizing a complex object, said method comprising the data processing implemented steps of:

establishing said complex object within said object oriented programming environment;

associating said complex object with an attribute, wherein said attribute is associated with said plurality of operator input fields;

associating a plurality of objects with said complex object within said object oriented programming environment, each of said plurality of objects being associated with a different one of said plurality of operator input fields;

associating said different one of said plurality of operator input fields with a plurality of operator inputs for each of said plurality of objects;

permitting an operator to select said attribute utilizing a graphical user interface included within said data processing system;

in response to said operator selection of said attribute, utilizing said complex object to automatically determine within said data processing system a plurality of permitted combinations of said plurality of operator inputs, wherein each of said plurality of operator inputs determined within said data processing system is associated with said different one of said plurality of operator input fields for each of said plurality of objects;

presenting for selection by an operator said plurality of permitted combinations;

permitting an operator to select one of said plurality of permitted combinations; and in response to a selection of said one of said plurality of permitted combinations, automatically entering each of said plurality of operator inputs included within said one of said plurality of permitted combinations into said different one of said plurality of operator input fields for each of said plurality of objects.

2. The method in a data processing system for enhancing the efficiency of entry of operator inputs into a plurality of operator input fields utilizing a complex object according to claim 1 further comprising the steps of:

in response to said operator selection of said attribute, permitting an operator to specify one of said plurality of operator inputs associated with a particular one of said plurality of said operator input fields; and automatically determining within said data processing system a plurality of permitted combinations of said plurality of operator inputs, said plurality of operator inputs including said selected one of said plurality of operator inputs specified by said operator.

3. The method in a data processing system for enhancing the efficiency of entry of operator inputs into a plurality of operator input fields utilizing a complex object according to claim 1 wherein said attribute may be selected utilizing a graphical user input device and said graphical user interface.

4. An object oriented programming environment within a data processing system for enhancing the efficiency of entry of operator inputs into a plurality of operator input fields utilizing a complex object, said data processing system comprising:

means for establishing said complex object within said object oriented programming environment;

means for associating said complex object with an attribute, wherein said attribute is associated with said plurality of operator input fields;

means for associating a plurality of objects with said complex object within said object oriented programming environment, each of said plurality of objects being associated with a different one of said plurality of operator input fields;

means for associating said different one of said plurality of operator input fields with a plurality of operator inputs for each of said plurality of objects;

means for permitting an operator to select said attribute utilizing a graphical user interface included within said data processing system;

means responsive to said operator selection of said attribute, for utilizing said complex object to automatically determine within said data processing system a plurality of permitted combinations of said plurality of operator inputs, wherein each of said plurality of operator inputs determined within said data processing system is associated with said different one of said plurality of operator input fields for each of said plurality of objects;

means for presenting for selection by an operator said plurality of permitted combinations;

means for permitting an operator to select one of said plurality of permitted combinations; and means responsive to a selection of said one of said plurality of permitted combinations, for automatically entering each of said plurality of operator inputs included within said one of said plurality of permitted combinations into said different one of said plurality of operator input fields for each of said plurality of objects.

5. The object oriented programming environment with a data processing system for enhancing the efficiency of entry of operator inputs into a plurality of operator input fields utilizing a complex object according to claim 4 further comprising:

means responsive to said operator selection of said attribute, for permitting an operator to specify one of said plurality of operator inputs associated with a particular one of said plurality of said operator input fields; and means for automatically determining within said data processing system a plurality of permitted combinations of said plurality of operator inputs, said plurality of operator inputs including said selected one of said plurality of operator input specified by said operator.

6. The data processing system for enhancing the efficiency of entry of operator inputs into a plurality of operator input fields utilizing a complex object according to claim 4 wherein said means for permitting an operator to select said attribute is a graphical user input device.

7. The data processing system for enhancing the efficiency of entry of operator inputs into a plurality of operator input fields utilizing a complex object according to claim 6 wherein said graphical user input device is a mouse.

8. The data processing system for enhancing the efficiency of entry of operator inputs into a plurality of operator input fields utilizing a complex object according to claim 6 wherein said graphical user input device is a keyboard.

* * * * *